C. W. SALADEE.
Vehicle Spring.
No. 113,574. Patented April 11, 1871.
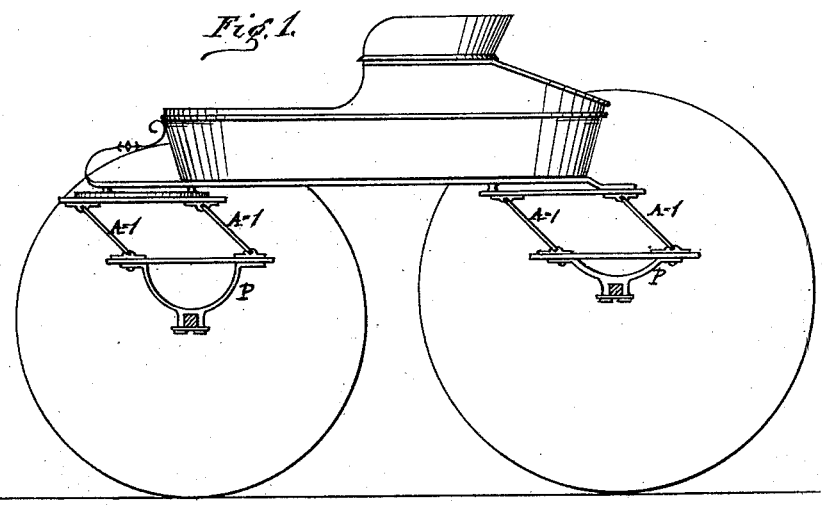
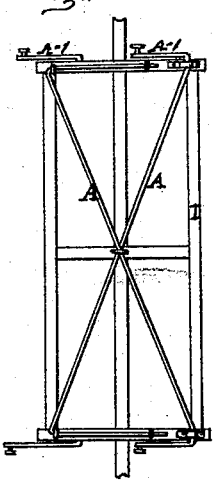
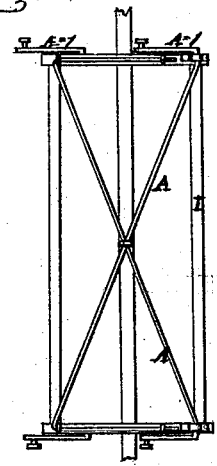
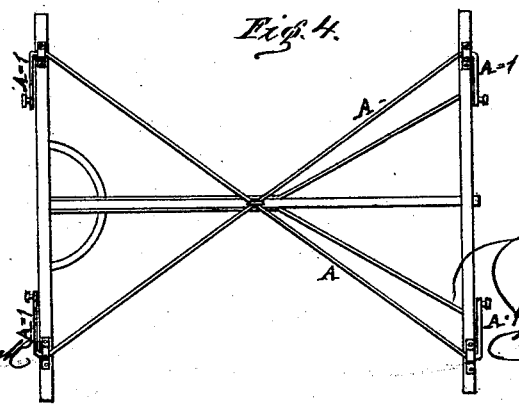
Witnesses. Inventor.

UNITED STATES PATENT OFFICE.

CYRUS W. SALADEE, OF ST. CATHARINES, CANADA, ASSIGNOR TO C. W. SALADEE & CO.

IMPROVEMENT IN SPRINGS FOR VEHICLES.

Specification forming part of Letters Patent No. 113,574, dated April 11, 1871.

*To all whom it may concern:*

Be it known that I, CYRUS W. SALADEE, of St. Catharines, county of Lincoln, Ontario, Canada, have invented a new and Improved Mode of Constructing Springs for Wheeled Vehicles and other purposes; and I do hereby declare that the following is a full, clear, and exact description thereof, reference being had to the accompanying drawing, and to the letters of reference marked thereon.

The nature of my invention consists in the use of torsion-springs, when crossed and operating substantially as hereinafter shown and described.

In the drawing, Figure 1 represents a side elevation of a buggy with my improved torsion-spring applied. Figs. 2 and 3 are top views over the front and back axles of the buggy, (seen in Fig. 1,) showing the arrangement of the springs A, and the manner of crossing each other, as well as the mode of securing them in position upon the frame I. Fig. 4 represents a top view of a buggy-gearing with perch, and showing my cross-torsion spring in position on this class of vehicle.

Figs. 1, 2, and 3 represent my spring when used as a "platform-spring" to that class of vehicles constructed without perch, while Fig. 4 represents it on that class with perch. In the former modification the arms and levers A' are arranged and operated parallel with each other, as clearly shown by Fig. 1, while in the latter these levers A' are so arranged as to vibrate toward each other at their points.

I make these springs from either square or round steel, of a thickness in proportion to the weight they are intended to carry.

The manner of connecting my cross-springs to the gearing and body of vehicles must vary according to the style or make of the same; but the connections as shown in the drawing are those that may be generally adopted.

Now, what I claim as new, of my invention, and desire to secure by Letters Patent, is—

Crossing torsion-springs A at or near their centers, and operating in combination with the cranks or levers A', substantially as and for the purpose shown and described.

In testimony that I claim the above-described mode of constructing springs for wheeled vehicles and other purposes, I have hereunto signed my name this 23d day of March, 1871.

CYRUS W. SALADEE.

Witnesses:
 EDM. F. BROWN,
 I. WALLIS.